Aug. 3, 1937.  G. A. MITCHELL  2,088,713
SHUTTER DISSOLVE MECHANISM
Filed May 5, 1934  6 Sheets-Sheet 1

Inventor.
George A. Mitchell.

Attorney.

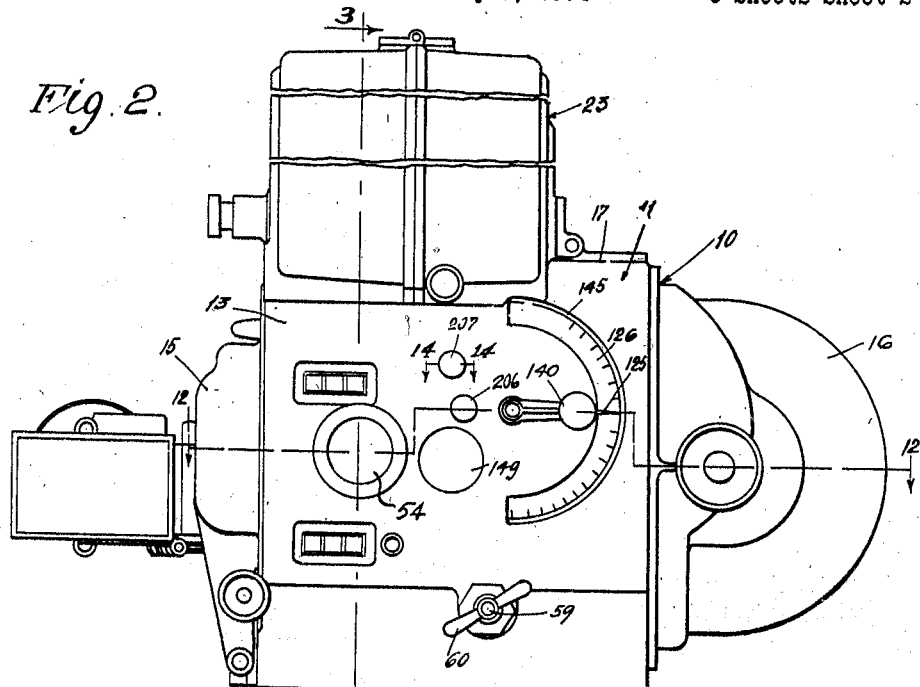

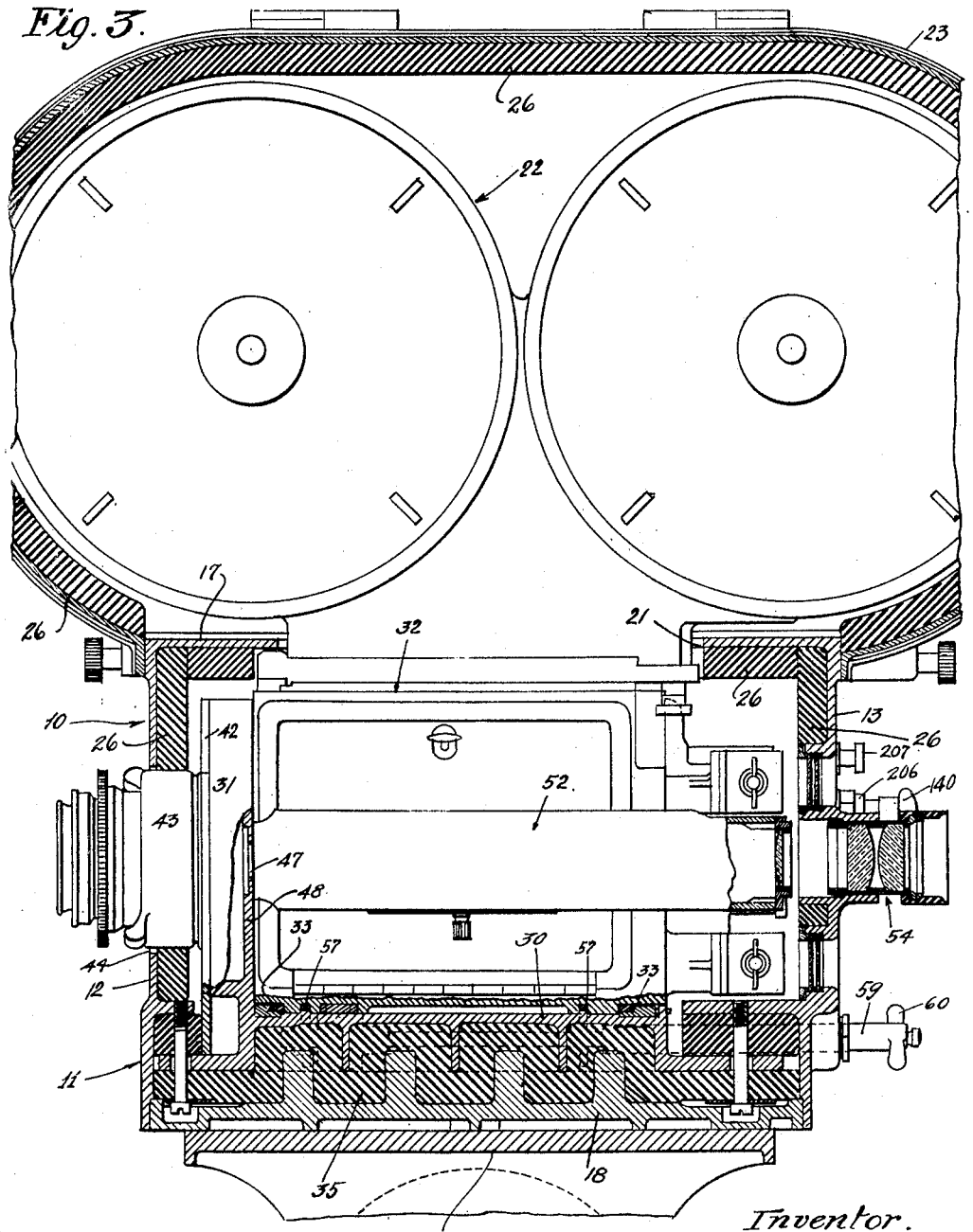

Aug. 3, 1937.  G. A. MITCHELL  2,088,713
SHUTTER DISSOLVE MECHANISM
Filed May 5, 1934  6 Sheets-Sheet 4

Inventor
George A. Mitchell.

Attorney

Aug. 3, 1937.  G. A. MITCHELL  2,088,713
SHUTTER DISSOLVE MECHANISM
Filed May 5, 1934    6 Sheets-Sheet 5

Inventor.
George A. Mitchell.
Attorney.

Aug. 3, 1937.    G. A. MITCHELL    2,088,713
SHUTTER DISSOLVE MECHANISM
Filed May 5, 1934    6 Sheets-Sheet 6
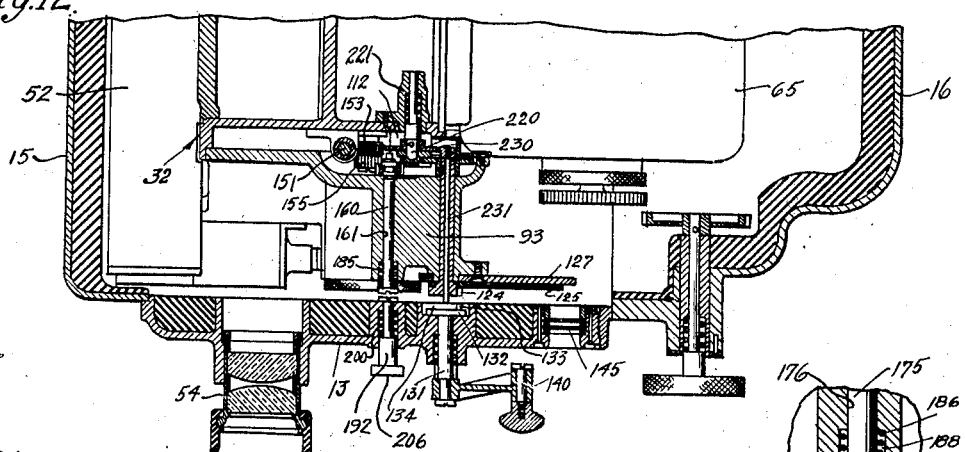
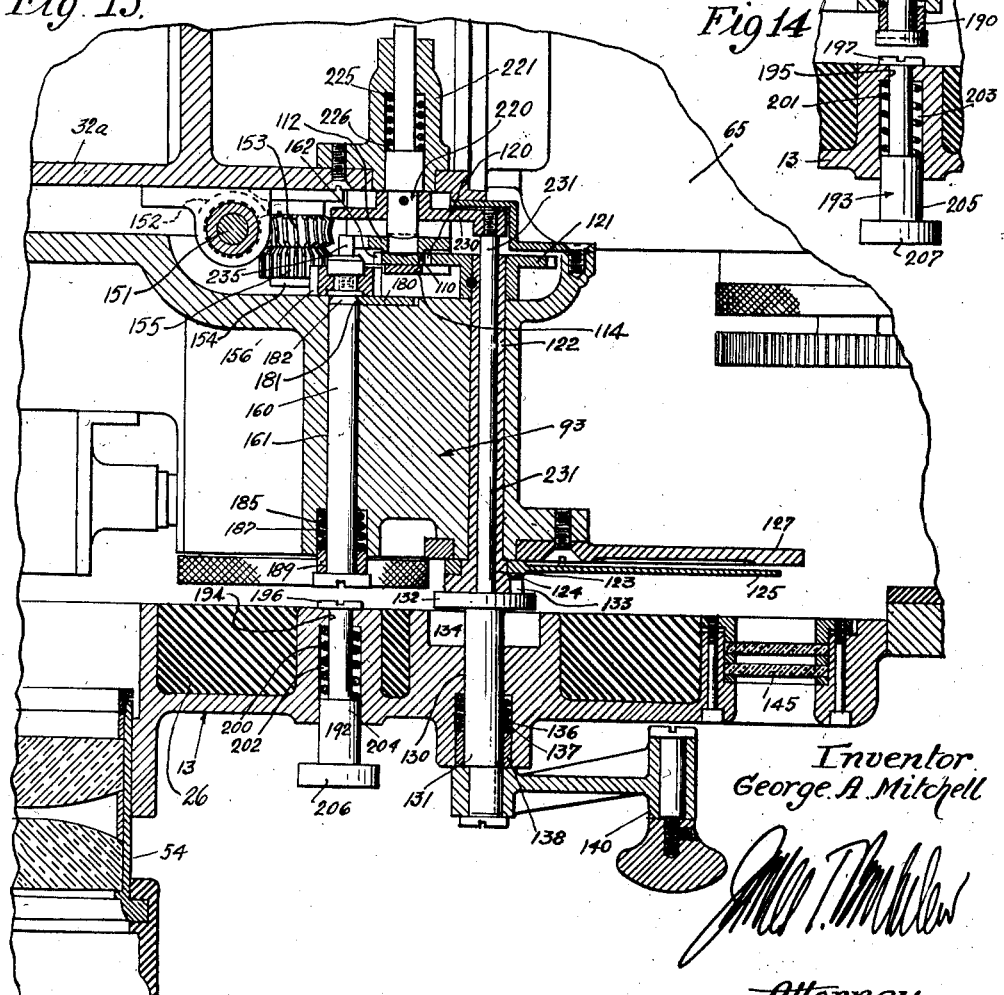
Inventor
George A. Mitchell
Attorney.

Patented Aug. 3, 1937

2,088,713

UNITED STATES PATENT OFFICE 2,088,713

SHUTTER DISSOLVE MECHANISM

George A. Mitchell, Los Angeles, Calif., assignor to Mitchell Camera Corporation, West Hollywood, Calif., a corporation of Delaware Application May 5, 1934, Serial No. 724,193

21 Claims. (Cl. 88—19.3)

This invention relates generally to motion picture cameras, and more particularly to shutter dissolve mechanisms for motion picture mechanisms.

Motion picture cameras of professional grade are ordinarily equipped with two relatively rotatable shutter members, which are adapted to take such a position as to provide an angular opening therebetween of say 170°, so as to uncover the film for substantially 170° of shutter rotation when the two shutter members are rotated as one; or are adapted, by relative adjustive rotation, to reduce the angular opening therebetween down to zero, or in other words to effect what is known as a dissolve. Means are commonly provided for effecting such a dissolve during photographing of a scene, either by manual or by automatic adjustment operation of the shutter mechanism.

Difficulty is commonly encountered in such mechanisms due to a relative creep of one shutter member relative to the other during normal operation of the camera, at which time the shutter shafts should rotate as one. Any such creep obviously means uncontrollable variations of the angular shutter opening, which, even if amounting to but a few degrees, is highly objectionable.

It is accordingly another object of the present invention to provide automatic means for positively locking the shutter members against relative rotation at all times except when either a dissolve is being effected, or the shutter opening is being increased.

The present invention provides an automatic lock which normally locks the dissolve mechanism against shutter adjustment operation, and which is automatically unlocked by virtue of operation of either the manual or automatic dissolve mechanism controls.

The invention will be better understood by now referring to a typical detailed description of a dissolve mechanism and locking device applied thereto, reference for this purpose being had to the accompanying drawings, in which:

Fig. 2 is a rear view of the camera shown in Fig. 1;

Fig. 3 is a section taken on line 3—3 of Fig. 2, with parts of the camera broken away to show underlying parts in section;

Fig. 4 is a section taken on line 4—4 of Fig. 1;

Fig. 12 is a section taken on line 12—12 of Fig. 2;

Fig. 13 is an enlarged detail taken from Fig. 12, but showing the parts in a different position; and Fig. 14 is a section taken on line 14—14 of Fig. 2;

Figure 1:
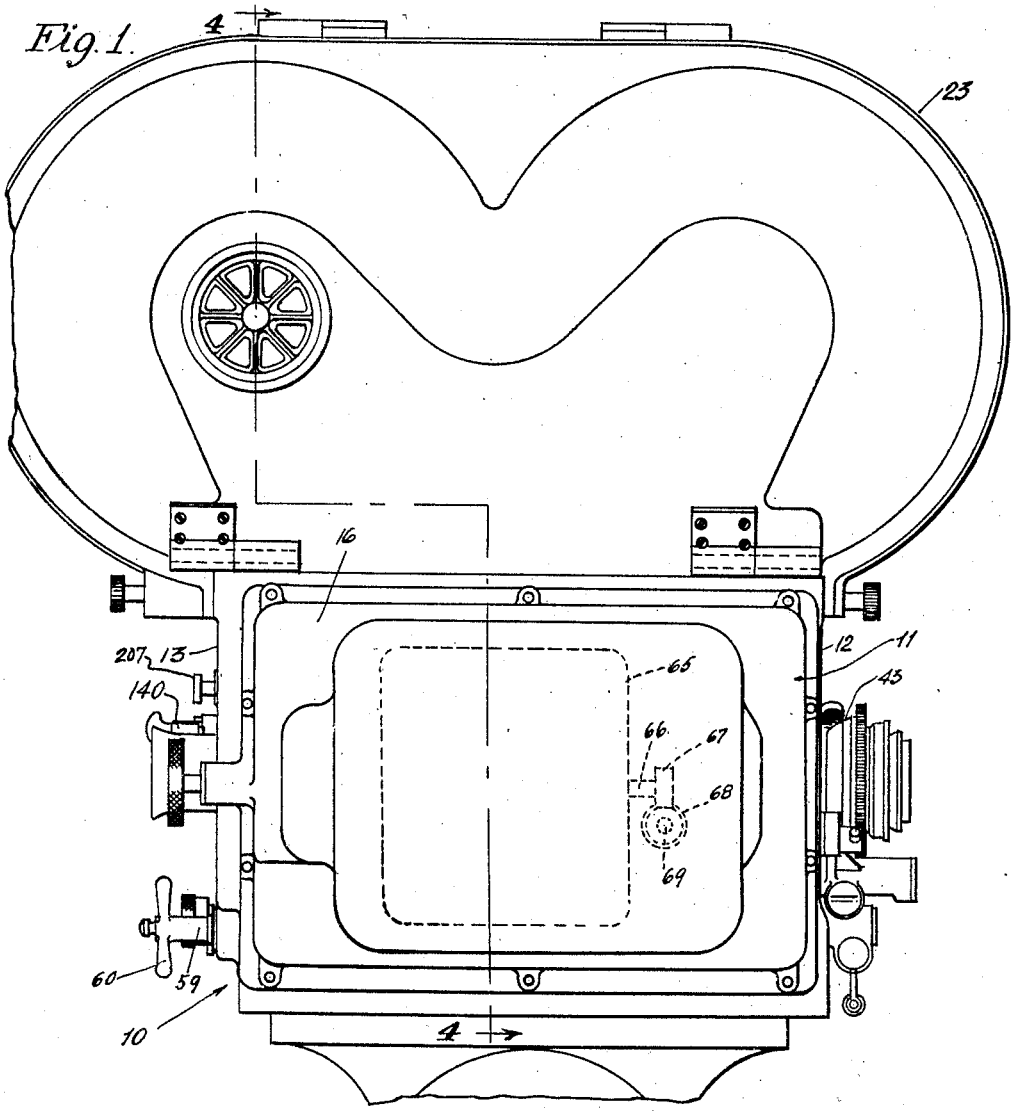
Fig. 1 is a side elevation of a motion picture camera equipped with the present invention.

The present invention is here shown in a specific form applied to a specific dissolve mechanism which is incorporated in a particular type of camera; it will be understood, however, that this is for other illustrative purposes only, and that the invention in its broader aspects is not to be limited to the particular illustrative form of the invention here detailed.

The camera here shown is of a special sound insulated type, completely disclosed and claimed in my copending application entitled Sound insulated motion picture camera, filed May 7, 1934, Ser. No. 724,351. It is characteristic of this type of camera that its film mechanism, including the drive motor, dissolve mechanism, film magazine and a focusing instrument, shifts laterally behind the photographic lens; and certain aspects of the present invention relate to dissolve mechanism control devices designed particularly for that type of camera.

In the drawings, numeral 10 designates generally the exterior case of the camera, this case comprising a box-like casting 11 including front and rear walls 12 and 13, respectively, side wall 14 having downwardly swinging door 15, side wall 16, top 17 and bottom or bed plate 18. This bed plate is adapted to be secured down to the head plate 20 of the tripod.

The top wall 17 of case 11 has a rectangular opening 21 through which extends the lower portion or throat of the usual camera magazine 22. A magazine compartment 23 is removably mounted on the top of case 11 around opening 21, and is of a size and shape to accommodate the camera magazine in the two different positions of the laterally shiftable camera box 32 that carries it.

The entire case and magazine compartment is shown to be lined with a layer 26 of suitable sound insulation material.

The operative motion picture camera mechanism, or camera proper, is mounted within this sound insulated case. This interior mechanism will be seen to embody a horizontal base or bed plate 30, having rising from its forward end a vertical, hollow head portion 31, and a camera box or mechanism carrier 32 located to the rear of head 31 and arranged to slide transversely across bed 30 in ways 33.

Camera base 30 is supported on an insulation pad 35, which rests on exterior housing bed plate 18, and is secured in place within the exterior housing in any suitable manner; for instance, in the manner clearly shown in Fig. 3.

The hollow camera head 31 that rises from the forward end of base member 30 is closed at its forward side by a plate 42 that carries the lens mount 43, the lens mount projecting forwardly through a circular opening 44 in front casing wall 12. This lens mount carries the usual photographic lens, not shown. Immediately to the rear of the photographic lens and in alinement therewith there is formed in head 31 the usual photographic aperture, indicated at 47, this aperture extending through the rear wall 48 of the hollow head 31.

The camera box 32 carries on its top the usual film magazine 22, as previously mentioned, and box 32 carries the usual film guide rollers, sprockets, and intermittent film movement mechanism, for intermittently moving the film downwardly within box 32 past aperture 47, in the focal plane of the photographic lens, these parts all being well known and requiring no present illustration.

Mounted on the side of camera box 32 at the level of photographic aperture 47 is a focusing tube 52. The forward end of this focusing tube comes closely adjacent the rear surface of camera head 31 when camera box 32 is moved to the right on bed 30 (viewing the camera from the rear), and by such movement the forward end of the focusing tube is brought into register with the photographic aperture 47 in head 31 and thus into alinement with the photographic lens. In this position the focusing tube alines with an eye piece 54 which is permanently mounted in the rear wall 13 of the exterior camera case, this eye piece being mounted in permanent optical alinement with aperture 47 and the photographic lens. The other camera box position, indicated in Figs. 4 and 12, is the "take" position, with the film within the camera box alined with aperture 47 and the photographic lens, and the focusing tube 52 moved out of alinement therewith. When the camera box is moved from the illustrated "take" position to a position with the focusing tube alined with aperture 47 and with its eye-piece 54, then the image normally formed on the film may be viewed through eye piece 54 and the focusing tube, and at this time the photographic lens may be accurately focused. The camera box is then shifted back to the position of Figs. 4 and 12 for "taking", and the image is sharp on the film.

For the purpose of so shifting the camera box between the taking and focusing positions described, the underside of said box is provided with a pair of racks 57, with which mesh spur gear 58 on a shaft 59 that extends outwardly through the rear wall 13 of the exterior housing, and has on its outer end an operating handle 60 (Figs. 3 and 4). Rotation of this handle 60 causes gears 58 to act through racks 57 to shift the camera box from one position to the other.

Figure 5:
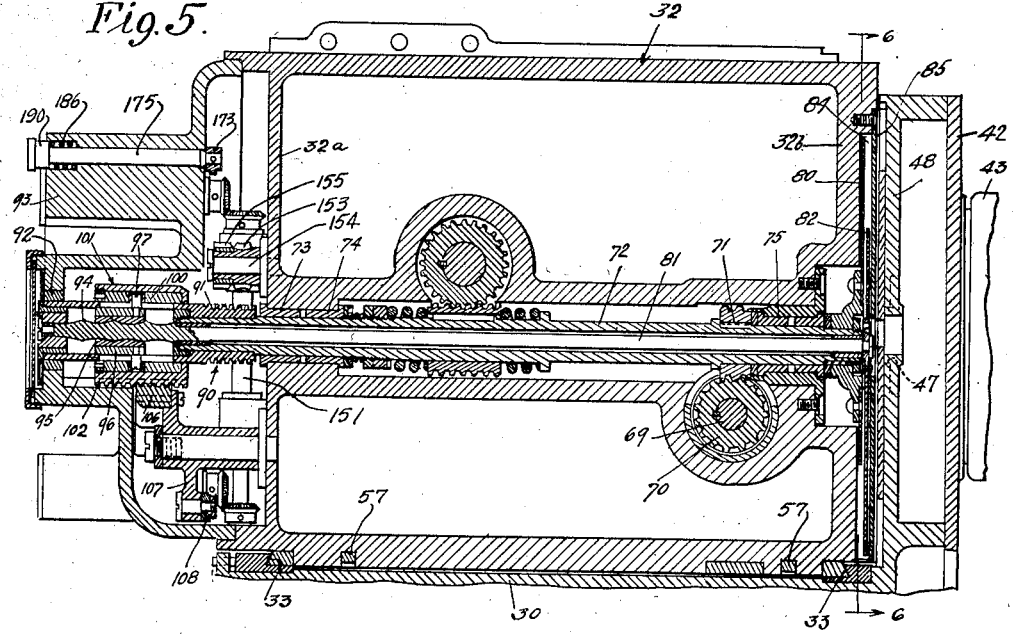
Fig. 5 is a section taken on line 5—5 of Fig. 4.

The camera motor is designated at 65, its housing being affixed to the side of camera box 32 (Figs. 4 and 12), so that the camera motor shifts with the transverse movement of the camera box. The motor shaft 66 has on its forward end a spiral gear 67 (Fig. 1) meshing with a spiral gear 68 on a transverse shaft 69 that drives the usual intermittent film mechanism (not shown). Shaft 69 also drives the shutter mechanism and has for this purpose a spiral gear 70 (Fig. 5) meshing with a spiral gear 71 which is mounted fast on the forward end of hollow shutter shaft 72. Shaft 72 is shown in Fig. 5 to be journaled in suitable bearings 73, 74, and 75 supported by camera box 32. On the extreme forward end of hollow shaft 72 is the usual shutter 80. Mounted to rotate within hollow shaft 72 is an inner shaft 81, and mounted on the forward end thereof is a shutter leaf 82. These shutter members 80 and 82 rotate within an annular recess 84 sunk in the front face of camera box forward wall 32b, this recess being enclosed by a cover plate 85 which has an aperture 86 registering with photographic apertures 47 of camera head 31.

Figure 6:
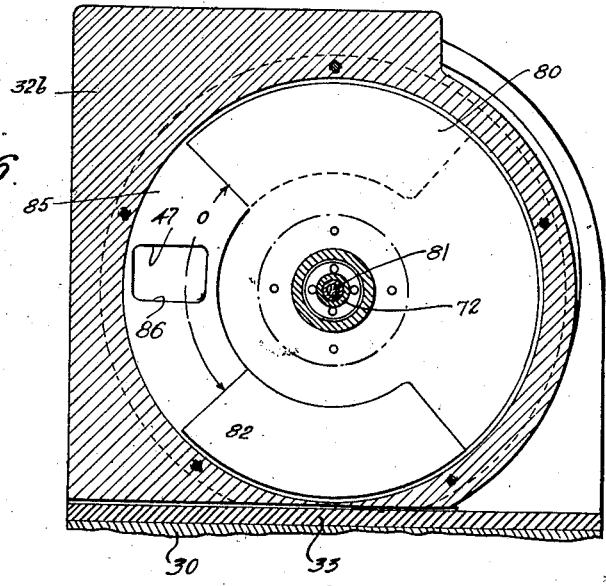
Fig. 6 is a section taken on line 6—6 of Fig. 5.

Shutter members 80 and 82, which are of conventional form, will be understood to be mounted to rotate between the photographic aperture and the film within camera box 32. These shutter members are adapted to take such a relative position as to provide substantially a 170° angular opening therebetween, so as to uncover the film for substantially 170° of rotation when shutter shafts 72 and 81 are rotated as one; or, by relative adjustive rotation of said shafts, to reduce the angular opening between the shutter members down to zero, or in other words to effect what is known as a dissolve. In Fig. 6 the shutter members are shown during the course of such a dissolve, the shutter opening O being reduced to approximately 90°.

Fastened on hollow shutter shaft 72, immediately to the rear of camera box rearward wall 32a, is a gear sleeve 90 (Figs. 5 and 7), the forward end of which is formed as a worm 91, and the rearward end of which is journaled in a bearing 92 carried by mounting casting 93 secured to camera box 32. The rearward end of inner shutter shaft 81 has a screw section 94, and mounted to work thereon is a nut member 95. This nut member 95 is fast within a sleeve 96 which slidably fits the bore of gear sleeve 90, and carries studs 97 which project outwardly through longitudinal slots 98 in sleeve 90. The outer ends of studs 97 engage in apertures 99 in a sleeve 100 which is slidably mounted on sleeve 90. This sleeve 100 is embraced at its ends by and is rotatable within a cylindric carrier 101, the lower side of which has a downwardly projecting gear portion or rack 102. This carrier member 101 is constrained against rotation by a way 104 formed in member 93 (Fig. 8) which receives and guides said gear projection 102 for longitudinal movement. Gear portion 102 is formed with spiral gear teeth and the latter mesh with a spiral gear segment 106. Fast with this gear segment is a depending arm 107, to the lower end of which is pivoted one end of a link 108, the other end of which is pivoted to a vertically movable rack 110 (Figs. 7, 8, 10, 11, 12 and 13).

This rack 110 moves vertically in a vertical guide groove or way 111 formed in the outer surface of a vertical supporting member 112 which is mounted on camera wall 32a, the rack being confined in said way by means of a plate 114 mounted on the outer surface of member 112 (Figs. 7, 8, 10, and 11). The lower portion of cover plate 114 is formed with a longitudinal slot 115 which passes the pivot connection between link 108 and rack 110.

This rack 110 has on one edge rack teeth 120 which are constantly in mesh with a spur gear 121, which gear is fast on a rearwardly extending hollow shaft 122 journaled in said mounting casting 93. The rearward end of shaft 122 has an integrally formed head 123, having in its rearward surface an off center aperture 124 (Figs. 12 and 13). Head 123 carries a pointer 125 which is adapted to move through substantially 170° of arc over a calibrated shutter-opening scale 126 inscribed on a plate 127 carried by mounting member 93. Journaled in and longitudinally slidable through a bore 130 in rear housing wall 13 is a shaft 131, the inner end of which carries a crank disc 132 having a crank pin 133, said crank disc and pin being adapted to be received within a countersink 134 formed in the inner surface of wall 13 (Fig. 12). Shaft 131 normally carries crank disc 132 and pin 133 in the latter position by reason of a coil spring 136 placed around said shaft in a counter bore 137, which spring acts outwardly against a collar 138 on shaft 131. The exterior end of shaft 131 carries a manual operating crank 140.

Figure 7:
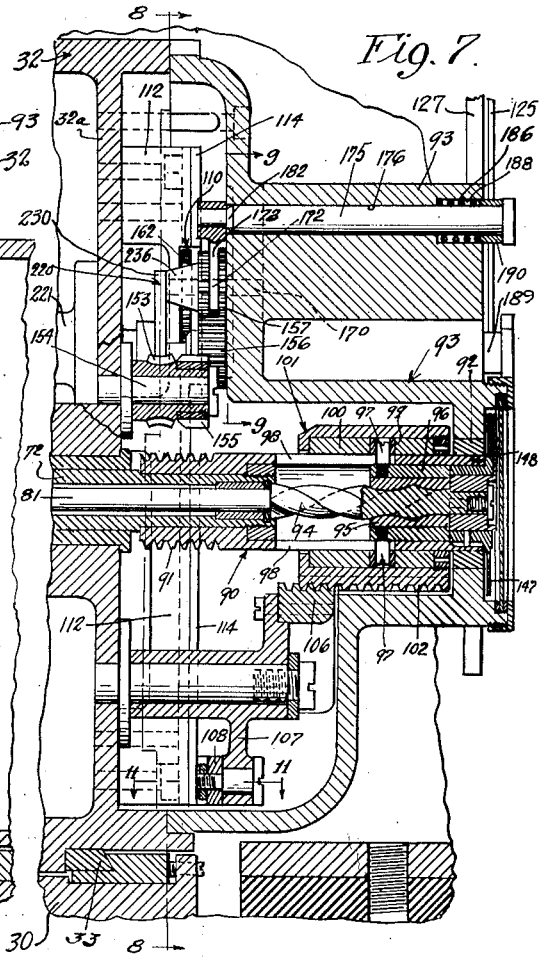
Fig. 7 is a section taken on line 7—7 of Fig. 4.

Shaft 131 is so located in camera housing wall 13 as to be concentric with shaft 122 when the camera box 32 has been moved to the "take" position indicated in Figs. 12 and 13. Crank pin 133 on shaft 131 is so arranged that at a time when the camera box is in the position of Fig. 12, it may be drivingly engaged with aperture 124 by forcing crank 140 and shaft 131 inwardly against the force of spring 136 and turning the crank until the pin finds the aperture. This engagement having been made, turning of crank 140 causes rotation of shaft 122 and gear 121, thereby moving rack 110 up or down, depending upon the direction in which the crank is turned. Such movement of rack 110 acts through link 108 and arm 107 to rotate spiral gear segment 106, which in turn acts on spiral gear element 102 to cause longitudinal translation of carrier member 101. The rotating sleeve 100 embraced and carried by member 101 is thus caused to move longitudinally on gear sleeve 90, and in so doing acts through stud 97 to move nut member 95 forwardly or rearwardly within the bore of the gear sleeve. Since the nut member is constrained against relative rotation within the gear sleeve, this longitudinal movement of the nut member causes rotation of the screw element 94 relative to gear sleeve 90, and consequently relative rotation of shaft 81 within hollow shaft 72. Thus by this operation the opening between the shutter members carried by the shutter shafts 72 and 81 may be varied between zero and 170°, and this control may obviously be effected when the camera is in full operation. The scale 124 which indicates the degrees of shutter opening is visible from outside the camera through an arcuate glass window 145 in wall 13, with which the scale comes into register when the camera box is in the position of Fig. 12. Preferably, the rear end of inner shutter shaft 81 and the rear end of gear sleeve 90 on hollow shutter shaft 72 are provided with shutter signal devices 147 and 148, respectively, (Figs. 4 and 7). Member 147 is a circular disc, one half of which is painted black to correspond with the shutter opening of the shutter on the forward end of shaft 72, while member 148, which may be painted black all over, is of the same shape as the shutter leaf on the forward end of shutter shaft 81. These shutter signal members register with a double glass walled window 149 in rear camera wall 13 (Fig. 2) when the camera mechanism is in the "take" position described, and indicate at a glance the positions of the two shutter members.

Thus when camera box 32 has been moved by operation of handle 60 to "take" position, the dissolve mechanism carried by said box comes into operative relation with a manual crank which is mounted in the rear exterior housing wall, and which may at that time be operatively engaged with the dissolve mechanism.

Figure 8:
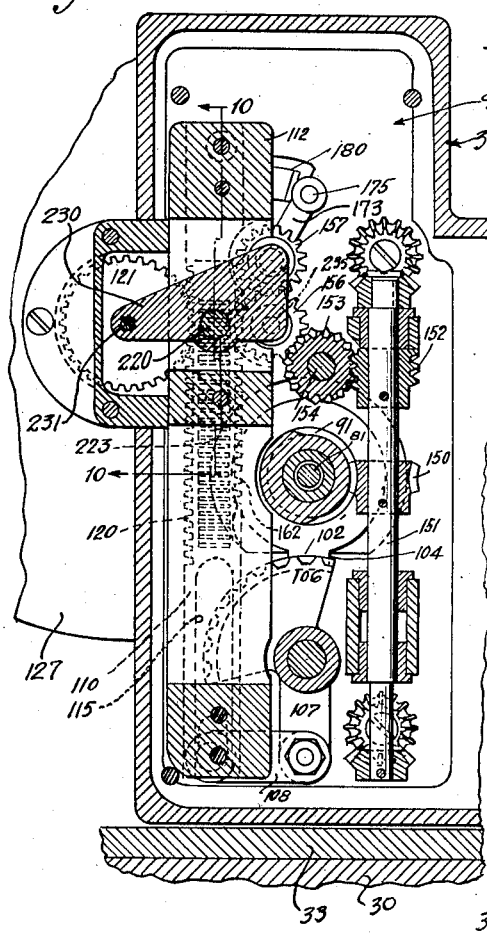
Fig. 8 is a section taken on line 8—8 of Fig. 7.

The dissolve mechanism also involves automatic devices for accomplishing the dissolve, which likewise register with control devices mounted in the rear camera case wall 13 when the camera box has been moved to the "take" position illustrated in Fig. 12. The worm 91 on gear sleeve 90 meshes with worm gear 150 on a vertical shaft 151 (Figs. 7 and 8). Shaft 151 carries a spiral gear 152 which meshes with a spiral gear 153 on a stud shaft 154, said shaft 154 also carrying a spur gear 155. Gear 155 meshes with a spur gear 156, which in turn meshes with another spur gear 157 directly over it.

Gear 156 is mounted to rotate on the inner end of a shaft 160 which is mounted to reciprocate through a bore 161 in casting 93 (Figs. 12 and 13). Movement of shaft 160 inwardly from the position shown in Figs. 12 and 13 engages gear 156 with gear teeth 162 on the edge of vertically movable rack 110 which is opposite to the previously mentioned rack teeth 120. Gears 155, 156 and 157 are of sufficient length relative to each other that gear 156 remains in mesh with the other two gears during such movement into mesh with the rack. It will be evident that when gear 156 is thus in mesh with rack gear teeth 162, the rack will be moved in a vertical direction, and will actuate the shutter dissolve mechanism in a manner similar to that effected when hand crank 140 is operated, as previously described. The rack is then being moved by power applied through the gear train from the rotating shutter shaft 72. The upper gear 157 is mounted on a shaft 170 (Fig. 7) which is longitudinally movable in a bore in casting 93, gear 157 having a peripheral groove 172 engaged by a fork 173 mounted on the inner end of control shaft 175 which is mounted for longitudinal reciprocation through a bore 176 in casting 93. Inward movement of shaft 175 from the position shown in Fig. 7 causes gear 157 to move inwardly into engagement with the rack teeth 162 of rack 110, while remaining in mesh with its driving gear 156, and since gears 156 and 157 rotate in opposite directions, the rack is then moved in a direction opposite to that effected during the engagement of gear 156 with the rack, thus causing automatic operation of the dissolve mechanism in a sense opposite to that effected by engagement of gear 156 with the rack.

Figure 9:
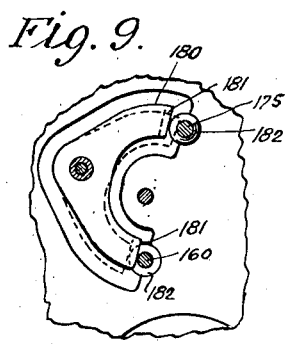
Fig. 9 is a section taken on line 9—9 of Fig. 7.
Figure 10:
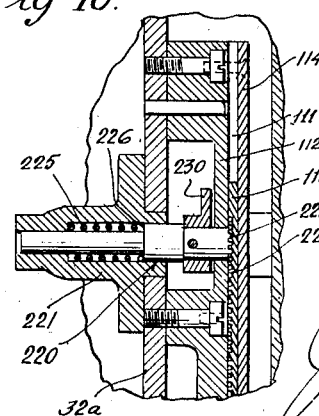
Fig. 10 is a section taken on line 10—10 of Fig. 8.
Figure 11:
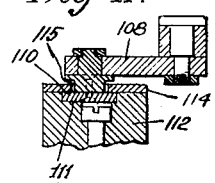
Fig. 11 is a section taken on line 11—11 of Fig. 7.

To prevent the gears 156 and 157 from being engaged simultaneously with the rack, there is provided a safety guard in the form of a pivoted yoke 180 (Figs. 9 and 13), the two arms of which have beveled ends 181 which engage conical surfaces 182 on shafts 160 and 175. The relative arrangement of the parts is such that in order for either of the two shafts to move inwardly to engage its gear with the rack, its conical surface 182 in engagement with the beveled end of the corresponding yoke arm must cause the yoke to swing to a position with the beveled end of its other arm moved into locking engagement with the inwardly inclined conical surface 182 of the other shaft. Thus but one of the two shafts can be moved inwardly at a time, inward movement of either one of the shafts positively locking the other against similar movement.

It has been said that gears 156 and 157 are moved into mesh with rack 110 by virtue of inward movement of shafts 160 and 175, respectively. These shafts are normally yieldingly held in a rearwardly retracted position by means of coil springs 185 and 186, respectively, (Figs. 7 and 13) placed around the shafts in counterbores 187 and 188, and acting outwardly on the shaft collars 189 and 190 which work within said counterbores.

The outer ends of shafts 160 and 175 are adapted to be actuated by actuating plungers 192 and 193, respectively, (Figs. 13 and 14) which are mounted to reciprocate through bores 194 and 195 in rear housing wall 13, and are located in said wall in such position that plungers 192 and 193 come into end to end register with shafts 160 and 175, respectively, when the camera box 32 is moved to photographing position (Fig. 12). The inner ends of plungers 192 and 193 have enlarged heads 196 and 197, respectively, adapted to engage the adjacent ends of shafts 160 and 175, said heads being engageable against the inner surfaces of rear wall casting 13 to limit outward movement of the plungers. The plungers are normally yieldingly held in a position with heads 196 and 197 in such engagement with wall 13 (clearing the outer ends of shafts 160 and 175) by means of coil springs 200 and 201 respectively, placed around said plungers in counterbores 202 and 203, and acting outwardly against shaft collars 204 and 205 which work within said counterbores.

On the outwardly projecting ends of plungers 192 and 193 are push buttons 206 and 207, respectively. It will be evident that normally there is no interference between shafts 160 and 175, and their actuating plungers 192 and 193, so that the camera box 32 is free of interference in its transverse shift; but that, when camera box 32 is in photographing position (Fig. 12), either of the plungers, say 192, may be moved inwardly by pressure of the finger on push button 206, until the inner end of said plunger engages the outer end of its corresponding shaft 160 and moves the latter inwardly to engage gear 155 with rack 110, with the previously described resulting operation of the dissolve mechanism. Upon release of push button 206, both members 160 and 192 return to their normal extended inoperative position. Shaft 175 is similarly operated to engage gear 157 with the rack by pushing inwardly on push button 207.

The means for locking the dissolve mechanism in such a way that relative rotation between the two shutter shafts cannot take place during normal operation of the camera will now be described in detail. For this purpose there is provided a locking plunger 220 (see Figs. 8, 10, 12 and 13) which is mounted to reciprocate in a bearing 221, the latter extending through and being fastened to camera wall 32a in such disposition that the end of plunger 220 is immediately opposite the rear side of rack member 110. The forward end of plunger 220 is provided with horizontally cut teeth 222 (Fig. 10), which are adapted to engage similar horizontal teeth 223 (see also Fig. 8) cut in a vertical row on the adjacent side of said rack. A coil spring 225 placed around plunger 220 and engaging a plunger shoulder 226 urges said plunger to move in a direction to engage its teeth 222 with rack teeth 223. It will be evident that this engagement, which may be made at any position of rack 110, positively locks the rack against vertical movement, and hence locks the entire dissolve mechanism adjustment means against operation. It will be evident, however, that this locking means does not lock the shutter mechanism against operation, since the shutter shafts are left free to rotate, and sleeve 100 is free to rotate with said shaft; the mechanism is locked, however, against longitudinal movement of sleeve 100 on gear sleeve 99, which is the action causing relative rotation of inner shutter shaft 81 with reference to hollow shutter shaft 72.

When the dissolve mechanism is to be operated for the purpose of changing the shutter opening, plunger 220 is withdrawn against spring 225 to disengage the rack for vertical movement. Plunger 220 carries for this purpose a plate 230, into one end of which is screwthreaded a push rod 231 which is reciprocable through the aforementioned hollow shaft 122 and projects normally a short distance beyond the shaft head 123 (Fig. 12). When crank 140 is moved inwardly to engage crank pin 133 with aperture 124 for the purpose of accomplishing a manual dissolve, crank disc 132 engages the projecting end of push rod 231 and forces it inwardly, thereby moving plate 230 and locking plunger 220 to disengage said plunger with rack 190. This disengaged position is shown in Fig. 13. The rack is thus freed for vertical movement, and manual crank 140 may be turned to accomplish the dissolve mechanism desired. When crank 140 is released, it moves outwardly under the influence of its spring 136, and so releases push rod 231 and plate 230 to move outwardly under the influence of locking plunger spring 225, which thereupon acts to move the locking plunger into engagement with the rack teeth to lock the dissolve mechanism against further shutter adjustment movement.

Locking plunger 230 is also moved inwardly to release the rack with inward movement of either shaft 160 or shaft 175 in meshing gears 156 or 157, respectively, with the rack. For this purpose shaft 160 has on its extreme inner end an extension 235 (Fig. 13) adapted to engage plate 230 during its inward movement to move said plate and locking plunger 220 inwardly to disengage the rack for vertical movement. For the same purpose, gear 157 which is moved inwardly into mesh with the rack through inward movement of shaft 175 is provided with a projection 236 (Fig. 7) adapted to engage and move plate 230 during such inward movement, and so cause disengagement of the locking plunger with the rack, thereby freeing the latter for vertical movement.

It is thus seen that the present invention provides means which positively locks the shutter shafts against relative rotation with respect to each other during normal operation of the camera, and which thus positively prevents creep of the shutter members with reference to each other, and therefore uncontrolled variation of the shutter opening angle, and that this locking means, which is adapted to lock the shutter shafts at any shutter opening angle desired, is automatically disengaged and frees the shutter shafts for relative adjustment rotation by virtue of throwing either the manual or automatic shutter adjustment control devices into operative relation with the dissolve mechanism.

Reference is here made to my copending application entitled Shutter dissolve mechanism, filed Dec. 7, 1935, Ser. No. 53,380, which contains claims to certain dissolve mechanism control devices herein disclosed.

While I have herein described one embodiment which the invention may assume in practice, it will be understood that it may assume other forms or be substantially modified without departing from the spirit and scope thereof or of the appended claims.

I claim:

1. In a shutter dissolve mechanism embodying relatively rotatable shutter members, shutter drive means for rotating said shutter members in unison, shutter adjustment means for causing relative rotation of said shutter members while they are being rotated by said shutter drive means, and manual means adapted to actuate said shutter adjustment means: movable positive locking means mounted independently of the shutter adjustment means and movable relatively to said means to enter into positive locking engagement therewith, said shutter adjustment means being adapted for positive locking reception of said locking means in various positions, and means for unlocking said locking means operated by actuation of said manual means to cause shutter adjustment operation.

2. In a shutter dissolve mechanism embodying relatively rotatable shutter members, shutter drive means for rotating said shutter members in unison, shutter adjustment means for causing relative rotation of said shutter members while they are being rotated by said shutter drive means, and manual means adapted to actuate said shutter adjustment means; movable positive locking means mounted independently of the shutter adjustment means and movable relatively to said means to enter into positive locking engagement therewith, said shutter adjustment means being adapted for locking reception of said locking means in various positions, yielding means normally holding said locking means in locking position, and means for unlocking said locking means against said yielding means operated by actuation of said manual means to cause shutter adjustment operation.

3. In a shutter dissolve mechanism embodying relatively rotatable shutter members, shutter drive means for rotating said shutter members in unison, shutter adjustment means for causing relative rotation of said shutter members while they are being rotated by said shutter drive means, and manually actuatable means adapted to actuate said shutter adjustment means: a movable positive locking member mounted for movement independently of the shutter adjustment means normally moved into a position of positive locking engagement with said shutter adjustment means to lock said means against shutter adjustment operation, said shutter adjustment means being adapted for positive locking reception of said locking member in various positions, and means for moving said locking member to unlocked position operated by actuation of said manual means to cause shutter adjustment operation.

4. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, a positive locking member mounted independently of the shutter adjustment mechanism and movable into positive locking engagement with said normally stationary member to lock the shutter adjustment mechanism against adjustment operation, said normally stationary member being adapted for positive locking reception of said locking member in various positions, and manual means for moving said locking member out of locking engagement with said shutter adjustment member and thereafter actuating said shutter adjustment member.

5. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, manual means for moving said shutter adjustment mechanism member, a movable positive locking member mounted for movement independently of the shutter adjustment mechanism and positioned normally in locking engagement with said shutter adjustment mechanism member, said shutter adjustment member being adapted for positive locking reception of said locking member in various positions, and means for disengaging said locking member from said shutter adjustment mechanism member actuated by virtue of actuation of said manual means.

6. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, manual means for moving said shutter adjustment mechanism member, a movable positive locking member mounted for movement independently of the shutter adjustment mechanism and adapted to be moved into positive locking engagement with said shutter adjustment mechanism member, said shutter adjustment member being adapted for positive locking reception of said locking member in various positions, yielding means urging said locking member into such locking engagement, and means for disengaging said locking member from said shutter adjustment mechanism member actuated by virtue of actuation of said manual means.

7. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, manual means movable into operative driving relation with said shutter adjustment mechanism member and operable to move said member, and a movable locking member normally in locking engagement with said shutter adjustment mechanism member, said locking member adapted to be moved to disengage said member by virtue of moving said manual member into driving rotation with said shutter adjustment mechanism member.

8. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, shiftable means adapted to drivingly interconnect the shutter drive means with said shutter adjustment mechanism member to cause movement of the latter, a movable positive locking member normally in positive locking engagement with said shutter adjustment mechanism member, and means actuated by virtue of shifting said interconnecting means to drivingly interconnect the shutter drive means with the shutter adjustment mechanism member for disengaging said locking member from the shutter adjustment mechanism member.

9. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, manually actuatable means for moving said shutter adjustment mechanism member, a positive locking member mounted independently of the shutter adjustment mechanism and movable along a fixed path into positive locking engagement with said shutter adjustment mechanism member, said shutter adjustment mechanism member being adapted for positive locking reception of said locking member in various positions along the path of movement of said shutter adjustment mechanism member, and means for disengaging said locking member from the shutter adjustment mechanism member as the manually actuatable means is actuated to cause movement of the shutter adjustment mechanism member.

10. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a reciprocable rack gear stationary during normal operation of the shutter members but movable to accomplish relative rotation thereof, a locking plunger reciprocable at right angles to said rack gear and adapted to move into locking engagement therewith, a gear means for moving said rack gear, manual means drivingly engageable with said gear means, and means for disengaging the locking plunger from the rack operated by virtue of drivingly engaging said manual means with said gear means.

11. A shutter dissolve mechanism embodying relatively rotatable shutter members, shutter drive means for rotating said shutter member in unison, shutter adjustment mechanism for causing relative rotation of said shutter members while they are being rotated by said shutter drive means, said shutter adjustment mechanism including a reciprocable rack gear stationary during normal operation of the shutter members but movable to accomplish relative rotation thereof, a locking plunger reciprocable at right angles to said rack gear and adapted to move into locking engagement therewith, a gear adapted to be moved into mesh with said rack, a driving interconnection between said gear and the shutter drive means, manual means for moving said gear into mesh with the rack, and means actuated by virtue of moving said gear into mesh with the rack for disengaging the locking plunger from the rack.

12. A shutter dissolve mechanism embodying relatively rotatable shutter members, shutter drive means for rotating said shutter member in unison, shutter adjustment mechanism for causing relative rotation of said shutter members while they are being rotated by said shutter drive means, said shutter adjustment mechanism including a reciprocable rack gear stationary during normal operation of the shutter members but movable to accomplish relative rotation thereof, a locking plunger reciprocable at right angles to said rack gear and adapted to move into locking engagement therewith, gear means for moving said rack gear, said gear means including a hollow shaft rigid and concentric with a pinion gear of said means, manual means for rotating said hollow shaft, including a manually reciprocable and rotatable shaft concentric therewith, clutch means between the near ends of said shafts adapted to form a rotatable driving connection therebetween upon axial movement of the manually rotatable shaft toward the hollow gear shaft, and an inner shaft reciprocable through said hollow gear shaft and connected with said locking plunger and adapted by axial movement to move said plunger out of engagement with the rack gear, said inner shaft normally projecting from the end of the hollow shaft to be engaged by the manually rotatable shaft and so moved to cause said disengagement of the locking plunger from the rack gear when the manually rotatable shaft is moved axially to drivingly engage the hollow gear shaft.

13. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a reciprocable rack gear stationary during normal operation of the shutter members but movable to accomplish relative rotation thereof, said rack gear formed with a longitudinally extending series of transverse teeth, a locking plunger reciprocable at right angles to said rack gear and adapted to move into locking engagement with said rack teeth, gear means for moving said rack, and means for disengaging said locking plunger from the rack during drive of the rack by said gear means.

14. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a reciprocable member stationary during normal operation of the shutter members but movable to accomplish relative rotation thereof, said reciprocable member formed with a longitudinally extending series of transversely cut teeth, a locking plunger reciprocable at right angles to the direction of reciprocation of said reciprocable member and adapted to move into locking engagement with said transverse teeth, and means for disengaging said locking plunger from said reciprocable member.

15. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a gear member stationary during normal operation of the shutter members but movable to accomplish relative rotation thereof, a movable locking member normally in locking engagement with said gear member, said gear member being adapted for locking reception of said locking member in various positions along the path of movement of said gear member, a driving pinion for moving said gear member, manual means drivingly connectible with said pinion, and means for automatically disengaging the locking member from the gear member when said manual means is drivingly engaged with said pinion.

16. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a gear member stationary during normal operation of the shutter members but movable to accomplish relative rotation thereof, a movable locking member normally in locking engagement with said gear member, said gear member being adapted for locking reception of said locking member in various positions along the path of movement of said gear member, a driving pinion adapted to be moved into mesh with said gear member, a driving interconnection between said pinion and the shutter drive means, manual means for moving said pinion into mesh with said gear member, and means actuated with movement of said pinion into mesh with the gear member for disengaging the locking member from the gear member.

17. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a gear member stationary during normal operation of the shutter members but movable to accomplish relative rotation thereof, a driving pinion for moving said gear member, manual means drivingly connectible with said pinion, a movable locking member normally in locking engagement with the shutter adjustment mechanism, the shutter adjustment mechanism being adapted for locking reception of said locking member in various positions of adjustment of said mechanism, and means for automatically disengaging the locking member from the shutter adjustment mechanism when said manual means is drivingly connected with said pinion.

18. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a gear member stationary during normal operation of the shutter members but movable to accomplish relative rotation thereof, a driving pinion adapted to be moved into mesh with said gear member, a driving interconnection between said pinion and the shutter drive means, manual means for moving said pinion into mesh with said gear member, a movable locking member normally in locking engagement with the shutter adjustment mechanism, the shutter adjustment mechanism being adapted for locking reception of said locking member in various positions of adjustment of said mechanism, and means for automatically disengaging the locking member from the shutter adjustment mechanism when said manual means is drivingly connected with said pinion.

19. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment including a gear member stationary during normal operation of the shutter members but movable to accomplish relative rotation thereof, a driving pinion adapted to be moved along its axis into mesh with said gear member, a longitudinally movable shaft on which said pinion is journalled, said shaft adapted to be moved longitudinally to carry said pinion into and out of mesh with said gear member, a driving interconnection between said pinion and the shutter drive means, said interconnection including a gear meshing with said pinion throughout axial movement of the latter with the longitudinally movable shaft, a movable locking member normally in locking engagement with the shutter adjustment mechanism, the shutter adjustment mechanism being adapted for locking reception of said locking member in various positions of adjustment of said mechanism, and means movable with the longitudinally movable shaft for retracting the locking member from engagement with the shutter adjustment mechanism when the shaft is moved to engage the pinion mounted thereon with the shutter adjustment gear member.

20. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a member stationary during normal operation of the shutter members but movable to accomplish relative rotation of the shutter members, manually actuatable means for moving said shutter adjustment mechanism member, said means including a normally disconnected driving train between the shutter drive means and the shutter adjustment mechanism and a manually controllable element for connecting said train, a positive locking member mounted independently of the shutter adjustment mechanism and movable along a fixed path into positive locking engagement with said shutter adjustment mechanism member, said shutter adjustment mechanism member being adapted for positive locking reception of said locking member in various positions along the path of movement of said shutter adjustment mechanism member, and means for disengaging said locking member from the shutter adjustment mechanism member as the manually actuatable means is actuated to cause movement of the shutter adjustment mechanism member.

21. A shutter dissolve mechanism embodying relatively rotatable shutter members, shutter drive means for rotating said shutter members in unison, shutter adjustment mechanism for causing relative rotation of said shutter members while they are being rotated by said shutter drive means, said shutter adjustment mechanism including a gear member stationary during normal operation of the shutter members but movable to accomplish relative rotation thereof, means for operating said gear member including a hollow shaft and a gear mounted thereon meshing with said gear member, manual means for rotating said hollow shaft, including a manually reciprocable and rotatable shaft concentric with said hollow shaft, clutch means between the near ends of said shafts adapted to form a rotatable driving connection therebetween upon axial movement of the manually rotatable shaft toward the hollow gear shaft, a movable locking member normally in locking engagement with the shutter adjustment mechanism, the shutter adjustment mechanism being adapted for locking reception of said locking member in various positions of adjustment of said mechanism, an inner shaft reciprocable through said hollow shaft and operatively connected with said locking member and adapted by axial movement to move said member out of locking engagement with the shutter adjustment mechanism, said inner shaft normally projecting from the end of the hollow shaft to be engaged by the manually rotatable shaft and so moved to cause said disengagement of the locking member from the shutter adjustment mechanism when the manually rotatable shaft is moved axially to drivingly engage the hollow gear shaft.

GEORGE A. MITCHELL.

CERTIFICATE OF CORRECTION.

Patent No. 2,088,713. August 3, 1937.

GEORGE A. MITCHELL.

It is hereby certified that error appears in the printed specification of the above numbered patent requiring correction as follows: Page 5, first column, line 44, claim 2, before the word "locking" insert positive; and that the said Letters Patent should be read with this correction therein that the same may conform to the record of the case in the Patent Office.

Signed and sealed this 19th day of October, A. D. 1937.

(Seal)

Henry Van Arsdale.
Acting Commissioner of Patents.